US010579129B2

(12) United States Patent
Zhang et al.

(10) Patent No.: US 10,579,129 B2
(45) Date of Patent: *Mar. 3, 2020

(54) METHOD, APPARATUS AND STORAGE MEDIUM FOR PROCESSING APPLICATION OF MOBILE TERMINAL AND ELECTRONIC DEVICE

(71) Applicant: GUANGDONG OPPO MOBILE TELECOMMUNICATIONS CORP., LTD., Dongguan, Guangdong (CN)

(72) Inventors: Jun Zhang, Guangdong (CN); Bin Wang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,467

(22) Filed: Jan. 9, 2019

(65) Prior Publication Data

US 2019/0155369 A1 May 23, 2019

Related U.S. Application Data

(63) Continuation of application No. 16/078,506, filed as application No. PCT/CN2017/086476 on May 29, 2017.

(30) Foreign Application Priority Data

May 31, 2016 (CN) .......................... 2016 1 0379894

(51) Int. Cl.
*G06F 1/00* (2006.01)
*G06F 1/3287* (2019.01)
*G06F 1/32* (2019.01)
*G06F 9/4401* (2018.01)
*G06F 1/28* (2006.01)

(52) U.S. Cl.
CPC .............. *G06F 1/3287* (2013.01); *G06F 1/28* (2013.01); *G06F 1/32* (2013.01); *G06F 9/4418* (2013.01)

(58) Field of Classification Search
CPC ........ G06F 1/3287; G06F 1/28; G06F 9/4418; G06F 1/32
See application file for complete search history.

(56) References Cited

U.S. PATENT DOCUMENTS

| 2013/0042128 | A1* | 2/2013 | Berry | .................... G06F 1/3206 713/323 |
| 2014/0082391 | A1* | 3/2014 | Sip | ........................ G06F 1/3203 713/323 |
| 2016/0124492 | A1* | 5/2016 | Parker | ..................... G06F 9/542 713/323 |

FOREIGN PATENT DOCUMENTS

| CN | 103037108 | 4/2013 |
| CN | 103235687 | 8/2013 |

(Continued)

OTHER PUBLICATIONS

EPO, Office Action for EP Application No. 17805824, dated Apr. 26, 2019.

(Continued)

*Primary Examiner* — Xuxing Chen
(74) *Attorney, Agent, or Firm* — Hodgson Russ LLP

(57) ABSTRACT

A method, an apparatus, a storage medium and an electronic device for processing an application of a mobile terminal are provided. The method includes the following acts. It is detected whether the mobile terminal is currently in standby state. All available sensor connection interfaces are traversed in responding to detecting that the mobile terminal is currently in standby state. It is determined whether an application corresponding to each of the available sensor connection interfaces is in accordance with a filtering con- (Continued)

dition. The application is exited in responding to determining that the application corresponding to each of the available sensor connection interfaces is not in accordance with the filtering condition, and the application is restrained from holding a corresponding sensor connection.

20 Claims, 4 Drawing Sheets

(56) References Cited

FOREIGN PATENT DOCUMENTS

| | | |
|---|---|---|
| CN | 104199670 | 12/2014 |
| CN | 104298336 | 1/2015 |
| CN | 104298547 | 1/2015 |
| CN | 105183137 | 12/2015 |
| CN | 105302274 | 2/2016 |
| CN | 106095051 | 11/2016 |
| EP | 2988191 A1 | 8/2015 |
| WO | 2013022464 | 2/2013 |

OTHER PUBLICATIONS

WIPO, ISR for Application No. PCT/CN2017/086476, dated Aug. 25, 2017.
SIPO, First Office Action for CN Application No. 201610379894, dated Apr. 27, 2018.
SIPO, Notification of Grant for CN Application No. 201610379894, dated Oct. 22, 2018.

\* cited by examiner

METHOD, APPARATUS AND STORAGE MEDIUM FOR PROCESSING APPLICATION OF MOBILE TERMINAL AND ELECTRONIC DEVICE

CROSS-REFERENCE TO RELATED APPLICATIONS

This application is a Continuation Application of U.S. application Ser. No. 16/078,506, filed on Aug. 21, 2018, which is a national phase entry of international application No. PCT/CN2017/086476, filed on May 29, 2017, which is based on and claims priority of Chinese Patent Application No. 201610379894.9, filed on May 31, 2016. The entire disclosures of the aforementioned applications are incorporated herein by reference.

FIELD

The present disclosure relates to a field of power consumption processing technologies, and more specifically to a method, an apparatus, a storage medium and an electronic device for processing an application of a mobile terminal.

BACKGROUND

Presently, an intelligent system has been an operating system platform of an intelligent terminal, which has the largest user base. The intelligent terminal is the most common and most important electronic device for many users at present. Various sensors in the intelligent terminal provide hardware foundation for application of diversification. However, non-standard methods for using the sensors, such as not releasing the sensors during standby state, which causes the system to fail to sleep and the sensors to continue to consume power, thus obviously increasing power consumption of the intelligent terminal during standby state.

SUMMARY

As a first aspect, embodiments of the present disclosure provide a method for processing an application of a mobile terminal. The method for processing the application of the mobile terminal includes the following acts.

It is detected whether the mobile terminal is currently in standby state.

All available sensor connection interfaces are traversed in responding to detecting that the mobile terminal is currently in standby state.

It is determined whether an application corresponding to each of the available sensor connection interfaces is in accordance with a filtering condition.

The application is exited in responding to determining that the application corresponding to each of the available sensor connection interfaces is not in accordance with the filtering condition, and the application is restrained from holding a corresponding sensor connection.

As a second aspect, embodiments of the present disclosure provide a storage medium. The storage medium has stored a plurality of instructions. The instructions are configured to be loaded by a processor to execute the following acts.

It is detected whether a mobile terminal is currently in standby state.

All available sensor connection interfaces are traversed in responding to detecting that the mobile terminal is currently in standby state.

It is determined whether an application corresponding to each of the available sensor connection interfaces is in accordance with a filtering condition.

The application is exited in responding to determining that the application corresponding to each of the available sensor connection interfaces is not in accordance with the filtering condition, and the application is restrained from holding a corresponding sensor connection.

As a third aspect, embodiments of the present disclosure provide an electronic device, including a processor and a memory. The memory has stored a plurality of instructions. The processor is configured to load the instructions in the memory to execute the following acts.

It is detected whether the electronic device is currently in standby state.

All available sensor connection interfaces are traversed in responding to detecting that the electronic device is currently in standby state.

It is determined whether an application corresponding to each of the available sensor connection interfaces is in accordance with a filtering condition.

The application is exited in responding to determining that the application corresponding to each of the available sensor connection interfaces is not in accordance with the filtering condition, and the application is restrained from holding a corresponding sensor connection.

DETAILED DESCRIPTION

Figure 1:
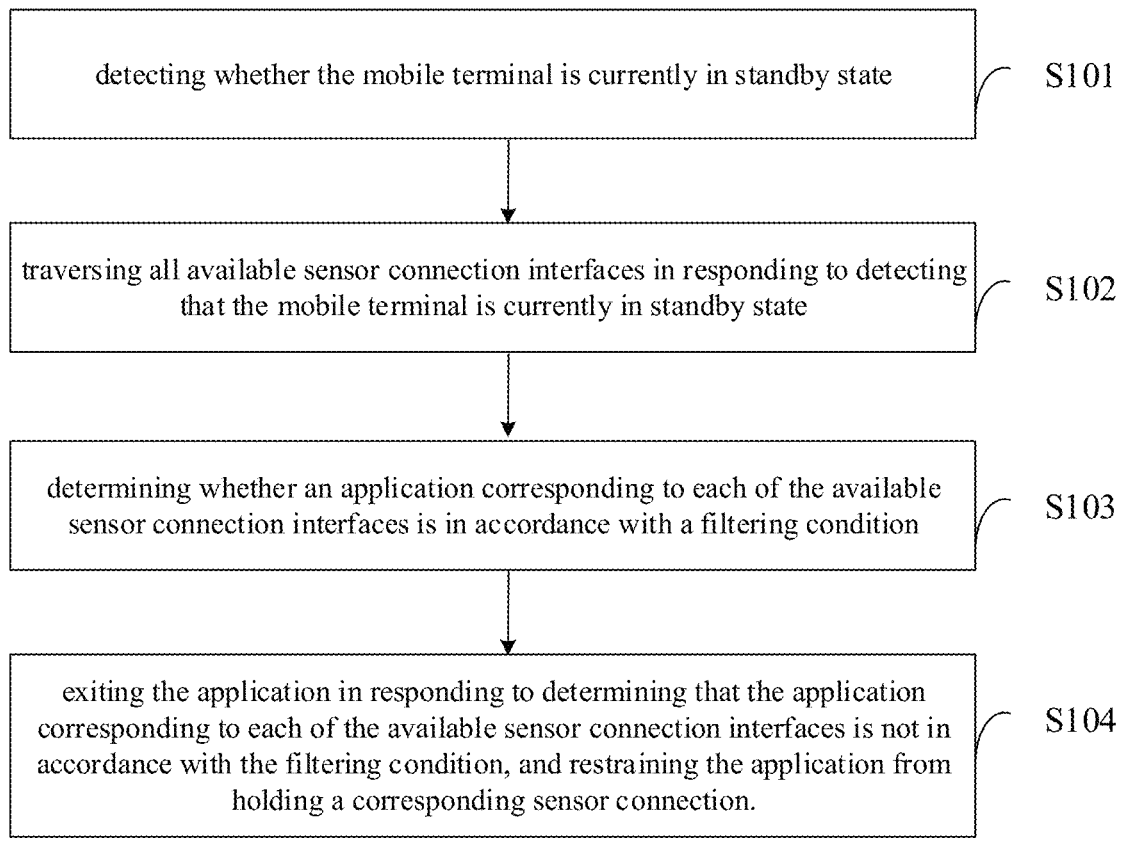
FIG. 1 is a flow chart illustrating a method for processing an application of a mobile terminal provided in embodiments of the present disclosure.

Principle of the present disclosure is exemplified by implementing in a suitable computing environment with reference to the drawings, in which the same reference numerals denotes the same elements. The following description is specific embodiments of the present disclosure based on illustrated examples, which is not taken as to limit other specific embodiments of the present disclosure that are not described in detailed herein.

The principle of the present disclosure is illustrated by the above text, which does not represent a limitation. Those skilled in the art will understand that various acts and operations described below may also be implemented in hardware. The principle of the present disclosure operates by using many other general purpose or special purpose operations, communication environments, or configurations.

It should be noted that an execution subject of embodiments of the present disclosure may be a mobile terminal. The mobile terminal may include a mobile phone (or called a "cellular" phone, such as a smartphone) and a computer provided with the mobile terminal, for example, a tablet computer or a mobile device built in a portable, pocket or hand-held vehicle computer. The mobile terminals exchange language and/or data with a wireless access network. For example, a personal communication service (PCS) phone, a cordless telephone, a session initiation protocol (SIP) phone, a wireless local loop (WLL) station, a personal digital assistant (PDA) and the other devices, which are not limited herein.

Embodiments of the present disclosure provides a method for processing an application of a mobile terminal, which includes the following.

It is detected whether the mobile terminal is currently in standby state.

When it is detected that the mobile terminal is currently in standby state, all available sensor connection interfaces are traversed.

It is determined whether an application corresponding to each of the available sensor connection interfaces is in accordance with a filtering condition.

When it is determined that the application corresponding to each of the available sensor connection interfaces is not in accordance with the filtering condition, the application is exited and the application is restrained from holding a corresponding sensor connection. In some embodiments, detecting whether the mobile terminal is currently in standby state, includes the following.

It is detected whether one or more operation instructions on one or more physical buttons and a touch screen are received within a preset time period.

When it is detected that the one or more operation instructions on the one or more physical buttons and the touch screen are not received within the preset time period, it is determined that the mobile terminal is currently in standby state.

When it is detected that the one or more operation instructions on the one or more physical buttons and the touch screen are received within the preset time period, it is determined that the mobile terminal is currently in non-standby state.

In some embodiments, detecting whether the mobile terminal is currently in standby state, includes the following.

It is detected whether a screen of the mobile terminal is in screen-off state.

When it is detected that the screen of the mobile terminal is in screen-off state, it is determined that the mobile terminal is currently in standby state.

When it is detected that the screen of the mobile terminal is in screen-on state, it is determined that the mobile terminal is currently in non-standby state.

In some embodiments, after traversing all available sensor connection interfaces, the method for processing the application of the mobile terminal further includes the following.

The application corresponding to each of the available sensor connection interfaces and the sensor connection held by the application are obtained.

In some embodiments, the method for processing the application of the mobile terminal further includes the following.

When it is determined that the application corresponding to each of the available sensor connection interfaces is in accordance with the filtering condition, the application is held to be turned on and the application is permitted to hold the corresponding sensor connection.

In some embodiments, before it is detected whether the mobile terminal is currently in standby state, the method for processing the application of the mobile terminal further includes the following.

When the application needs to use a sensor, a sensor connection interface is distributed to the application. The application is able to invoke the sensor to work based on the sensor connection interface.

In some embodiments, after it is detected whether the mobile terminal is currently in standby state, the method for processing the application of the mobile terminal further includes the following.

When it is detected that the mobile terminal is currently in standby state, it is determined whether a power management function is turned on.

When it is determined that the power management function is turned on, the act of traversing all available sensor connection interfaces is executed.

In an implementation, a method for processing an application of a mobile terminal is provided. As illustrated in FIG. 1, the method for processing the application of the mobile terminal, applied to the mobile terminal, specifically includes the acts in following blocks.

In block S101, it is detected whether the mobile terminal is currently in standby state.

An implementation solution of detecting whether the mobile terminal is currently in standby state may be as follows. It is detected whether a screen of the mobile terminal is in screen-off state. If yes, it may be determined that the mobile terminal is currently in standby state. If it is detected that the screen of the mobile terminal is in screen-on state, it may be determined that the mobile terminal is currently in non-standby state.

However, the following method may be adopted to determine whether the mobile terminal is currently in standby state. For example, it is detected whether the one or more operation instructions on the one or more physical buttons and the touch screen are received within the preset time period. If the one or more operation instructions on the one or more physical buttons and the touch screen are not received within the preset time period, it may be determined that the mobile terminal is currently in standby state. If it is detected that the one or more operation instructions on the one or more physical buttons and the touch screen are received within the preset time period, it may be determined that the mobile terminal is currently in non-standby state.

However, it is to be understood that it is not limited to the above determining methods, and any modification, equivalent replacement and improvement made within the spirit and principle of the present disclosure should be included in the protection scope of the present disclosure.

In one or more embodiments of the present disclosure, when the application needs to use a sensor, a sensor connection interface is distributed to the application. The application is able to invoke the sensor to work based on the sensor connection interface.

A functional architecture of managing the sensors is described in detailed below.

In an Android system of the mobile terminal, a sensor management framework may be include a client, a server and a HAL (Hardware Abstraction Layer). The client packages interfaces of using the sensors for applications. The server is responsible for management of all sensor data. The HAL packages direct access for the server to a Kernel. The server reads the sensor data from the HAL and writes it to a pipe. The client reads data of the server by the pipe.

When the application needs to use the sensor, firstly, a SystemSensorManager instance of the client is obtained and a listening interface is registered by this instance. After the listening interface is registered, the server provides a SensorEventConnection interface for the client, and the SensorEventConnection interface is distributed to the application. The application may obtain the data from the sensor by the client with this interface.

When the client registers the listening interface, the server may invoke an enable interface of a sensor to enable the sensor. When the client cancels the register of the listening interface, the server may invoke a disable interface of the sensor to disable the sensor.

In one or more embodiments of the present disclosure, a mobile terminal system adds a dumpConnections method for a SensorEventConnection class in a SensorService of a native layer. The dumpConnections method saves a sensor type, a sensor name and an application UID (unique identifier) registered for the sensor corresponding to a SensorEventConnection object to an appointed string.

In block S102, when it is detected that the mobile terminal is currently in standby state, all available sensor connection interfaces are traversed.

In one or more embodiments of the present disclosure, the mobile terminal system adds a service print determining mechanism in the dumpConnections method of the SensorService of the native layer. A parameter list of "args" passed by the dump method is obtained. When the parameter list includes a preset keyword such as "connections" parameter, all available SensorEventConnection interfaces in the SensorService are traversed, the dumpConnections method is invoked, and the sensor type and the application UID registered for the sensor corresponding to each sensor connection interface are returned.

In one or more embodiments of the present disclosure, after detecting whether the mobile terminal is currently in standby state, the method further includes as follows. When it is detected that the mobile terminal is currently in standby state, it is determined whether a power management function is turned on. When it is determined that the power management function is turned on, the act of traversing all available sensor connection interfaces is executed. It is to be understood that an interface may be provided, on which an open interface and a close interface of the power management function are provided. When the user clicks the open interface, the power management function is automatically started, and when the user clicks the close interface, the power management function is automatically closed.

However, it is to be understood that after traversing all available sensor connection interfaces, the method further includes as follows. The application corresponding to each of the available sensor connection interfaces and the sensor connection held by the application are obtained. Therefore, it facilitates block S103, i.e., it is determined whether the application corresponding to each of the available sensor connection interfaces is in accordance with the filtering condition. Also, it facilitates block S104, i.e., the application is exited according to the sensor connection held by the acquired application, and the application is restrained from holding the corresponding sensor connection.

In block S103, it is determined whether the application corresponding to each of the available sensor connection interfaces is in accordance with the filtering condition. The filtering condition may include the following. When the mobile terminal is in standby state, the application is held to be turned on, and the application is permitted to hold the corresponding sensor connection, that is, the application does not release the sensor connection.

The power management function application stores a set of mechanisms for determining whether to allow the application to hold the sensor in standby state (that is the above-mentioned filter conditions). For example, it is defined to allow several applications such as a sports application, a navigation application and a system built-in application to hold the sensor in standby state, and other applications rather than the above applications are prohibited to hold the sensor in standby state. Therefore, if the defined application holds the sensor connection in standby state, it may be filtered in block S103. Then the application which is not filtered in block S103 needs to turn to block S104 to perform corresponding operation.

However, it is to be understood that the power consumption management application of the mobile terminal system invokes the dump method of the SensorService, and passes the parameter "connections", to obtain the corresponding relationship between all applications and whether to hold the sensors during standby state.

However, it is to be understood that a list of applications that are allowed to hold the sensors in standby state may be generated by a security module of the mobile terminal, may be selected by the user, or may be pushed by the cloud server and the like.

In one or more embodiments of the present disclosure, a list of applications that are allowed to hold the sensors in standby state may be stored with the file mode on the mobile terminal side, or may be stored with the database mode on the mobile terminal side, or may be stored with the cloud server mode.

In the case of the file mode storage or the database mode storage, after turning on the power management function, the list of applications that are allowed to hold the sensors in standby state may be called from the mobile terminal.

If the storage is based on the cloud server mode, after the mobile terminal starts the power management function, the mobile terminal is triggered to read the list of applications that are allowed to hold the sensors in standby state from the cloud server.

In block S104, when it is determined that the application corresponding to each of the available sensor connection interfaces is not in accordance with the filtering condition, the application is exited, and the application is restrained from holding a corresponding sensor connection.

For example, if it is determined that the application corresponding to each of the available sensor connection interfaces is not in accordance with the filtering condition, the application is killed, and the application is restrained to start via broadcast, service and other way.

However, it is to be understood that if it is determined that the application corresponding to each of the available sensor connection interfaces is in accordance with the filtering condition, the application is held to be turned on, and the application is permitted to hold the corresponding sensor connection.

From the above, with the method for processing the application of the mobile terminal provided in the embodiments of the present disclosure, it is detected whether the mobile terminal is currently in standby state; when it is detected that the mobile terminal is currently in standby state, all available sensor connection interfaces are traversed; it is determined whether the application corresponding to each of the available sensor connection interfaces is in accordance with the filtering condition; when it is determined that the application corresponding to each of the available sensor connection interfaces is not in accordance with the filtering condition, the application is exited, and the application holding a corresponding sensor connection is restrained. With the present disclosure, the application which is not in accordance with the filtering condition in standby state is exited automatically, and this application is restrained from holding the corresponding sensor connection. Therefore, the mobile terminal system of the present disclosure may sleep in standby state, and effectively reduce power consumption of the mobile terminal, thus decreasing power consumption of the mobile terminal during standby state and effectively improves endurance capability of the mobile terminal.

Figure 2:
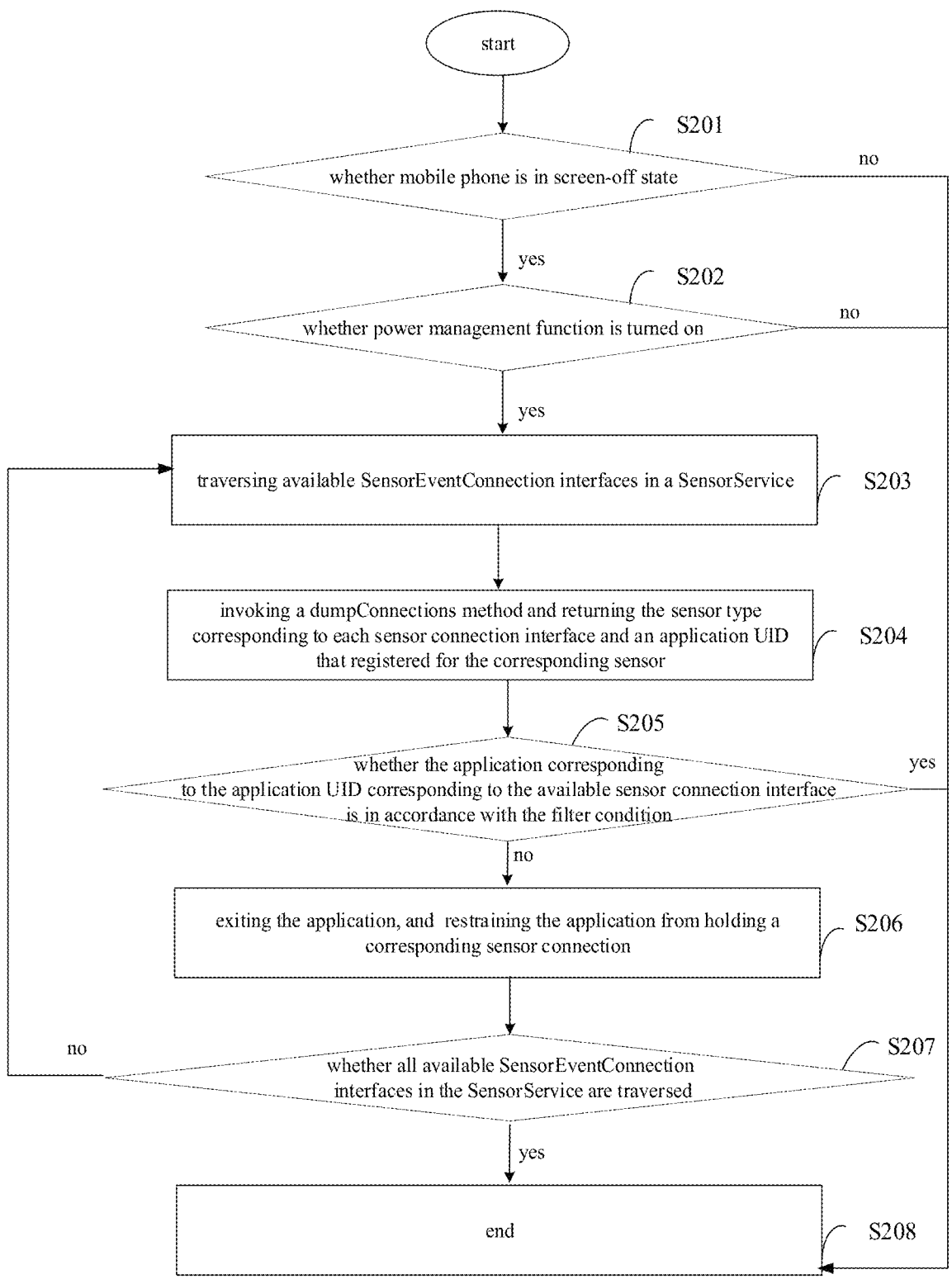
FIG. 2 is a detail flow chart illustrating a method for processing an application of a mobile terminal provided in embodiments of the present disclosure.

In an implementation, as illustrated in FIG. 2, a flow chart of a method for processing an application of a mobile terminal provided in embodiments of the present disclosure will be described in detail below.

In block S201, a mobile phone automatically detects whether it is in screen-off state.

In block S202, if it is detected that the mobile phone is in screen-off state, it is further determined whether a power management function is turned on.

In block S203, if it is determined that the power management function is turned on, all available SensorEventConnection interfaces in a SensorService are traversed.

In block S204, a dumpConnections method is invoked, the sensor type corresponding to each sensor connection interface and an application UID that registered for the corresponding sensor are returned.

In block S205, it is determined whether the application corresponding to the application UID corresponding to the available sensor connection interface is in accordance with the filter condition.

In block S206, if it is determined that the application corresponding to the available sensor connection interface is not in accordance with the filtering condition, the application is exited, and the application is restrained from holding a corresponding sensor connection.

The power management function application stores a set of mechanisms for determining whether to allow the application to hold the sensor in the standby state (that is the above-mentioned filter conditions). For example, it is defined to allow several applications such as a sports application, a navigation application and a system built-in application to hold the sensor in standby state, and other applications rather than the above applications are prohibited to hold the sensor in standby state.

In this block, for example, when it is determined that the application corresponding to each of the sensor connection interfaces does not belong to the sports application, the navigation application, and the system built-in application, it may be determined that the application corresponding to the connection interface is not accordance with the filtering condition, and the sensor connection needs to be released.

In block S207, it is determined whether all available SensorEventConnection interfaces in the SensorService are traversed.

In block S208, if it is determined that all available SensorEventConnection interfaces in the SensorService are traversed, the operation is ended. If it is determined that all available SensorEventConnection interfaces in the SensorService are not traversed, block S203 is returned to execute traversing a next available SensorEventConnection interface in the SensorService.

Embodiments of the present disclosure further provides an apparatus for processing an application of a mobile terminal, including the following.

A standby detecting module is configured to detect whether the mobile terminal is currently in standby state.

A traversing module is configured to traverse all available sensor connection interfaces when it is detected that the mobile terminal is currently in standby state.

A filtering determining module is configured to determine whether an application corresponding to each of the available sensor connection interfaces is in accordance with a filtering condition.

An application forbidding module is configured to exit the application if it is determined that the application corresponding to each of the available sensor connection interfaces is not in accordance with the filtering condition, and to restrain the application from holding a corresponding sensor connection.

In some embodiments, the standby detecting module is specifically configured to:

detect whether one or more operation instructions on one or more physical buttons and a touch screen are received within a preset time period;

determine that the mobile terminal is currently in standby state if it is detected that the one or more operation instructions on the one or more physical buttons and the touch screen are not received within the preset time period; and determine that the mobile terminal is currently in non-standby state if it is detected that the one or more operation instructions on the one or more physical buttons and the touch screen are received within the preset time period.

In some embodiments, the standby detecting module is specifically configured to:

detect whether a screen of the mobile terminal is in screen-off state;

determine that the mobile terminal is currently in standby state if it is detected that the screen of the mobile terminal is in screen-off state;

determine that the mobile terminal is currently in non-standby state if it is detected that the screen of the mobile terminal is in screen-on state.

In some embodiments, the apparatus for processing the application of the mobile terminal, further includes the following.

An obtaining module is configured to obtain the application corresponding to each of the available sensor connection interfaces and the sensor connection held by the application.

In some embodiments, the apparatus for processing the application of the mobile terminal, further includes the following.

An application permitting module is configured to hold the application to be turned on if it is determined that the application corresponding to each of the available sensor connection interfaces is in accordance with the filtering condition, and to permit the application to hold the corresponding sensor connection.

In some embodiments, the apparatus for processing the application of the mobile terminal, further includes the following.

An interface distribution module is configured to distribute a sensor connection interface to the application when the application needs to use a sensor The application is able to invoke the sensor to work based on the sensor connection interface.

In some embodiments, the apparatus for processing the application of the mobile terminal, further includes the following.

A power management function determining module is configured to determine whether a power management function is turned on when it is detected that the mobile terminal is currently in standby state.

The traversing module is specifically configured to traverse all available sensor connection interfaces if it is determined that the power management function is turned on.

Figure 3:
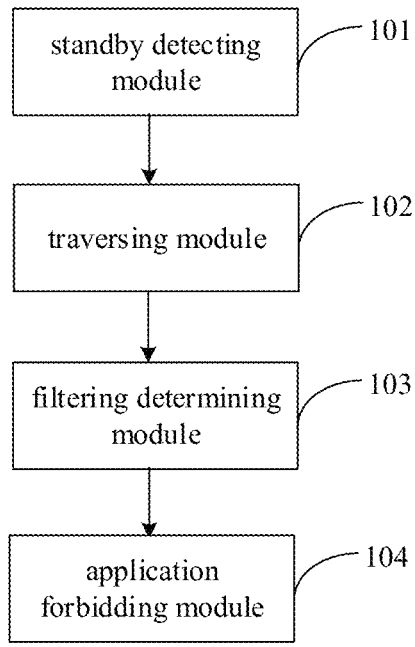
FIG. 3 is a block diagram illustrating an apparatus for processing an application of a mobile terminal provided in embodiments of the present disclosure.
Figure 4:
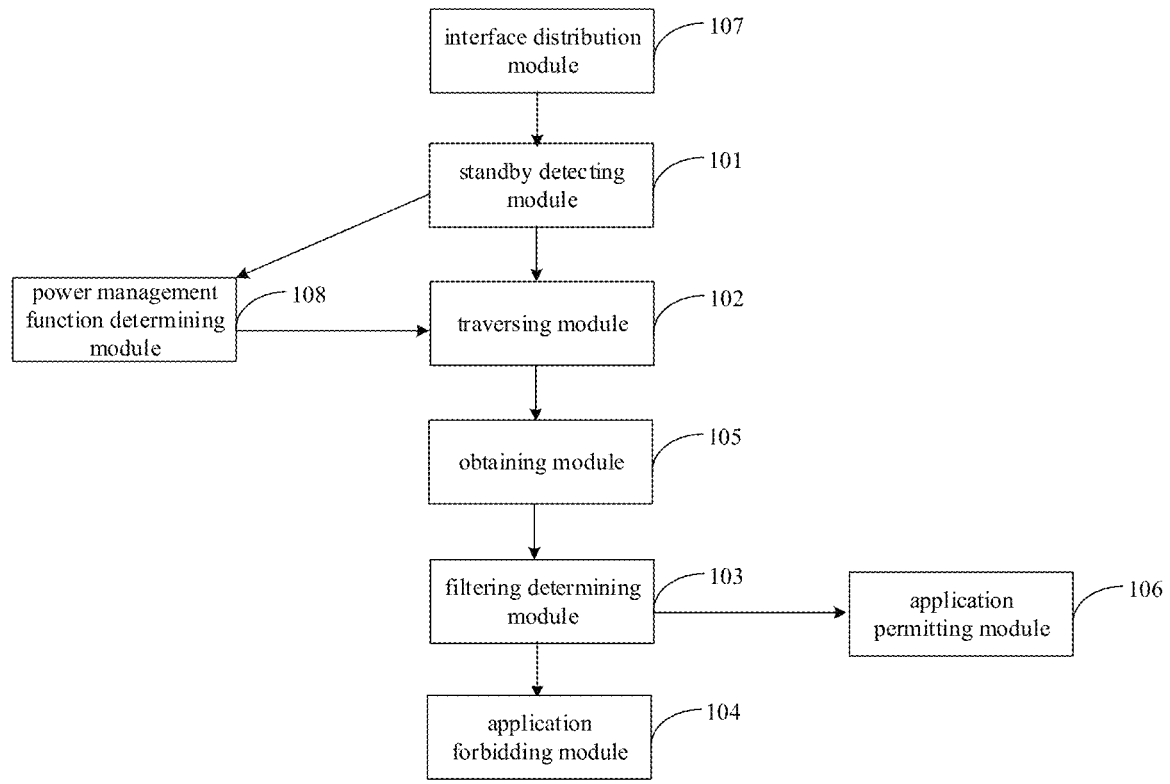
FIG. 4 is a detail block diagram illustrating an apparatus for processing an application of a mobile terminal provided in embodiments of the present disclosure.

In an implementation, as illustrated in FIG. 3 and FIG. 4, block diagrams of an apparatus for processing an application of a mobile terminal are provided for embodiments of the present disclosure. In order to illustrate, a part related to embodiments of the present disclosure is only illustrated. The apparatus for processing the application of the mobile terminal includes a standby detecting module 101, a traversing module 102, a filtering determining module 103 and an application forbidding module 104. The apparatus for processing the application of the mobile terminal may be built into a software unit, a hardware unit or a software and hardware combination unit of the mobile terminal.

The standby detecting module 101 is configured to detect whether the mobile terminal is currently in standby state.

An implementation solution of detecting whether the mobile terminal is currently in standby state may be as follows. It is detected whether a screen of the mobile terminal is in screen-off state. If yes, it may be determined that the mobile terminal is currently in standby state. If it is detected that the screen of the mobile terminal is in screen-on state, it may be determined that the mobile terminal is currently in non-standby state.

However, the following method may be adopted to determine whether the mobile terminal is currently in standby state. For example, it is detected whether the one or more operation instructions on the one or more physical buttons and the touch screen are received within the preset time period. If the one or more operation instructions on the one or more physical buttons and the touch screen are not received within the preset time period, it may be determined that the mobile terminal is currently in standby state. If it is detected that the one or more operation instructions on the one or more physical buttons and the touch screen are received within the preset time period, it may be determined that the mobile terminal is currently in non-standby state.

However, it is to be understood that it is not limited to the above determining methods, and any modification, equivalent replacement and improvement made within the spirit and principle of the present disclosure should be included in the protection scope of the present disclosure.

The traversing module 102 is configured to traverse all available sensor connection interfaces when it is detected that the mobile terminal is currently in standby state.

The filtering determining module 103 is configured to determine whether an application corresponding to each of the available sensor connection interfaces is in accordance with a filtering condition.

The power management function application stores a set of mechanisms for determining whether to allow the application to hold the sensor in standby state (that is the above-mentioned filter conditions). For example, it is defined to allow several applications such as a sports application, a navigation application and a system built-in application to hold the sensor in standby state, and other applications rather than the above applications are prohibited to hold the sensor in standby state.

The application forbidding module 104 is configured to exit the application if it is determined that the application corresponding to each of the available sensor connection interfaces is not in accordance with the filtering condition, and to restrain the application from holding a corresponding sensor connection.

Further, the apparatus for processing the application of the mobile terminal, further includes an obtaining module 105.

The obtaining module 105 is configured to obtain the application corresponding to each of the available sensor connection interfaces and the sensor connection held by the application.

Further, the apparatus for processing the application of the mobile terminal, further includes an application permitting module 106.

The application permitting module 106 is configured to hold the application to be turned on if it is determined that the application corresponding to each of the available sensor connection interfaces is in accordance with the filtering condition, and to permit the application to hold the corresponding sensor connection.

Further, the apparatus for processing the application of the mobile terminal, further includes an interface distribution module 107.

The interface distribution module 107 is configured to distribute a sensor connection interface to the application when the application needs to use a sensor. The application is able to invoke the sensor to work based on the sensor connection interface.

Further, the apparatus for processing the application of the mobile terminal, further includes a power management function determining module 108.

The power management function determining module 108 is configured to determine whether a power management function is turned on if it is detected that the mobile terminal is currently in standby state.

The traversing module 102 is configured to traverse all available sensor connection interfaces if it is determined that the power management function is turned on.

In the specific implementation, each of the above modules may be implemented as an independent entity or may be combined arbitrarily and implemented as one or more entities. For the specific implementation of each module above, reference may be made to the foregoing method embodiment, and details are not described herein again.

From the above, with the apparatus for processing the application of the mobile terminal provided in the embodiments of the present disclosure, it is detected whether the mobile terminal is currently in standby state; when it is detected that the mobile terminal is currently in standby state, all available sensor connection interfaces are traversed; it is determined whether the application corresponding to each of the available sensor connection interfaces is in accordance with the filtering condition; when it is determined that the application corresponding to each of the available sensor connection interfaces is not in accordance with the filtering condition, the application is exited, and the application holding a corresponding sensor connection is restrained. With the present disclosure, the application which is not in accordance with the filtering condition in standby state is exited automatically, and this application is restrained from holding the corresponding sensor connection. Therefore, the mobile terminal system of the present disclosure may sleep in standby state, and effectively reduce power consumption of the mobile terminal, thus decreasing power consumption of the mobile terminal during standby state and effectively improves endurance capability of the mobile terminal.

In an implementation, embodiments of the present disclosure further provides a storage medium. The storage medium has stored a plurality of instructions. The instructions are configured to be loaded by a processor to execute the following acts.

It is detected whether a mobile terminal is currently in standby state.

When it is detected that the mobile terminal is currently in standby state, all available sensor connection interfaces are traversed.

It is determined whether an application corresponding to each of the available sensor connection interfaces is in accordance with a filtering condition.

When it is determined that the application corresponding to each of the available sensor connection interfaces is not in accordance with the filtering condition, the application is exited and the application is restrained from holding a corresponding sensor connection.

Figure 5:
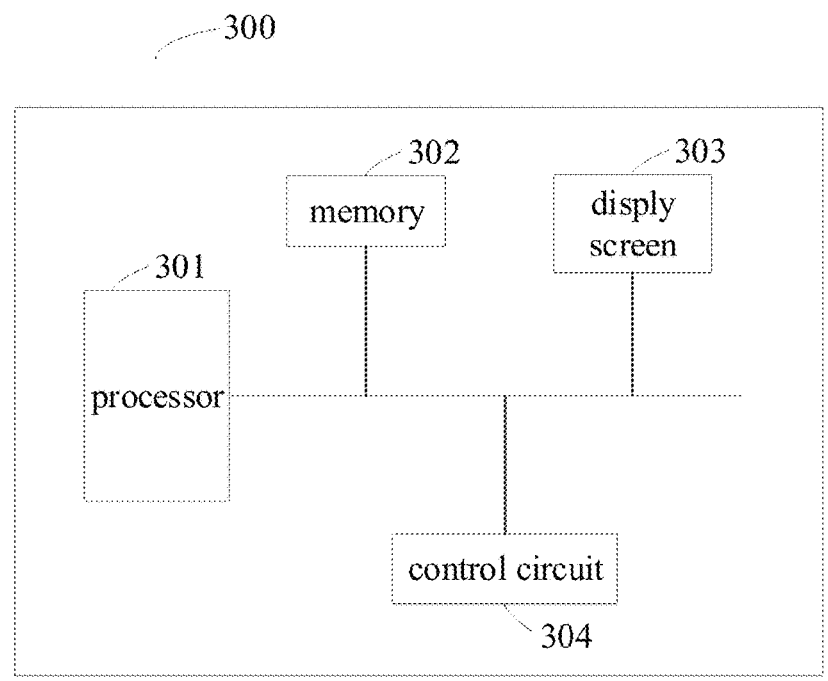
FIG. 5 is a block diagram illustrating an electronic device provided in embodiments of the present disclosure.

In an implementation, an electronic device is further provided. The electronic device may be an intelligent mobile phone, a tablet computer and the other device. As illustrated in FIG. 5, an electronic device 300 includes a processor 301, a memory 302, a display screen 303 and a control circuit 304. The processor 301 is electrically connected with the memory 302, the display screen 303 and the control circuit 304 respectively.

The processor 301 is a control center of the electronic device 300, connecting each part of the whole electronic device by various interfaces and lines, and executing various functions and processing data of the electronic device by running or loading applications stored in memory 302 and invoking data stored in the memory 302, thus monitoring the whole electronic device.

In one or more embodiments, according to the following acts, the processor 301 in the electronic device 300 loads instructions corresponding to processes of one or more applications into the memory 302 and runs the one or more applications stored in the memory 302 to realize various functions.

It is detected whether the electronic device is currently in standby state.

When it is detected that the electronic device is currently in standby state, all available sensor connection interfaces is traversed.

It is determined whether an application corresponding to each of the available sensor connection interfaces is in accordance with a filtering condition.

When it is determined that the application corresponding to each of the available sensor connection interfaces is not in accordance with the filtering condition, the application is exited, and the application is restrained from holding a corresponding sensor connection.

In some embodiments, the processor is further configured to execute the following.

After traversing all available sensor connection interfaces, the application corresponding to each of the available sensor connection interfaces and the sensor connection held by the application are obtained.

In some embodiments, the processor is further configured to execute the following.

When it is determined that the application corresponding to each of the available sensor connection interfaces is in accordance with the filtering condition, the application is held to be turned on, and the application is permitted to hold the corresponding sensor connection.

In some embodiments, the processor is further configured to, before detecting whether the electronic device is currently in standby state, execute the following acts.

A sensor connection interface is distributed to the application when the application needs to use a sensor. The application is able to invoke the sensor to work based on the sensor connection interface.

In some embodiments, the processor is further configured to, after detecting whether the electronic device is currently in standby state, execute the following.

When it is detected that the electronic device is currently in standby state, it is determined whether a power management function is turned on.

When it is determined that the power management function is turned on, the act of traversing all available sensor connection interfaces is executed.

The memory 302 may be configured to store the applications and the data. The applications stored in the memory 302 include instructions which may be executed by the processor. The applications may make up various function modules. The processor 301 runs the applications stored in the memory 302, to execute various application functions and data processing.

The display screen 303 may be configured to display information input by users or information provided for users and various graphical user interfaces of the terminal. The graphical user interfaces may consist of images, text, icons, video, and any combination thereof.

The control circuit 304 is electrically connected with the display screen 303 and configured to control the display screen 303 to display information.

Figure 6:
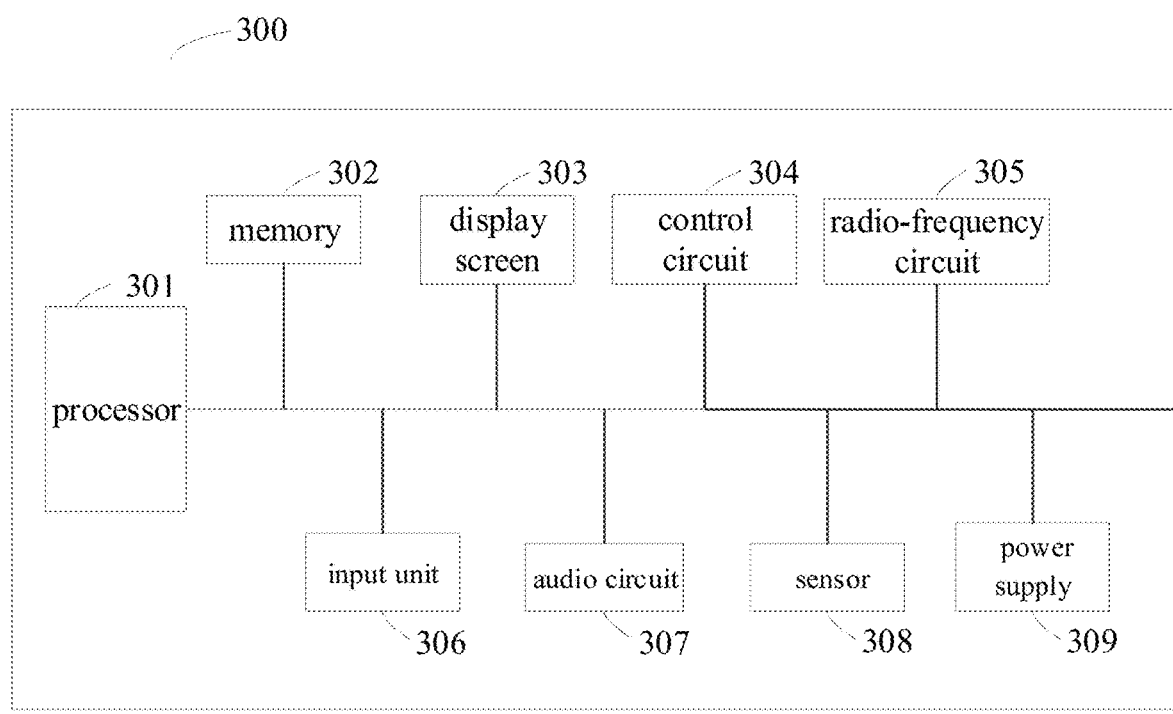
FIG. 6 is another block diagram illustrating an electronic device provided in embodiments of the present disclosure.

In some embodiments, as illustrated in FIG. 6, the electronic device 300 further includes a radio-frequency circuit 305, an input unit 306, an audio circuit 307, a sensor 308 and a power supply 309. The processor 301 is electrically connected with the radio-frequency circuit 305, the input unit 306, the audio circuit 307, the sensor 308 and the power supply 309 respectively.

The radio-frequency circuit 305 is configured to receive and send radio-frequency signals to establish wireless communication with network devices or other electronic devices by wireless communication, and to receive and send signals with the network devices or other electronic devices.

The input unit 306 may be configured to receive input numbers, character information, or user characteristic information (such as fingerprints), and to generate keyboard, mouse, joystick, optical or trackball signal input related to user settings and function control.

The audio circuit 307 may provide an audio interface between the user and the terminal through a speaker and a microphone.

The electronic device 300 may further include at least one sensor 308, for example, a light sensor, a motion sensor, and other sensors. In detail, the light sensor may include an ambient light sensor and a proximity sensor. The ambient light sensor may adjust a luminance of the display panel according to the luminance of the ambient light. The proximity sensor may turn off the display panel and/or backlight when the terminal is moved to the ear. As a kind of motion sensors, a gravity acceleration sensor may detect a magnitude of acceleration in all directions (usually three axes), and detect a magnitude and direction of gravity when it is at rest, and be configured to an application of identifying gestures of the mobile phone (such as horizontal and vertical screen switching, related games, magnetometer attitude calibration), vibration recognition related functions (such as pedometer, knock) etc.; the terminal may be further provided with a gyroscope, a barometer, a hygrometer, a thermometer, an infrared sensor, etc., it will not be repeated here.

The power supply 309 is configured to supply for the electronic device 300. In some embodiments, the power supply 309 may be logically connected to the processor 301 through a power management system, so that functions such as charge, discharge, and power management may be managed through the power management system.

Although not illustrated in FIG. 6, the electronic device 300 may further include a camera, a Bluetooth module, and the like, which are not described herein.

With the electronic device provided in the embodiments of the present disclosure, it is detected whether the electronic device is currently in standby state; when it is detected that the electronic device is currently in standby state, all available sensor connection interfaces are traversed; it is determined whether the application corresponding to each of the available sensor connection interfaces is in accordance with the filtering condition; when it is determined that the application corresponding to each of the available sensor connection interfaces is not in accordance with the filtering condition, the application is exited, and the application holding a corresponding sensor connection is restrained. With the present disclosure, the application which is not in accordance with the filtering condition in standby state is exited automatically, and this application is restrained from holding the corresponding sensor connection. Therefore, the mobile terminal system of the present disclosure may sleep in standby state, and effectively reduce power consumption of the electronic device, thus decreasing power consumption of the electronic device during standby state and effectively improves endurance capability of the electronic device.

It should to be noted that the ordinary skilled in the art may understand that all or part acts in various methods of the above embodiments may be accomplished through programs to instruct the relevant hardware. The programs may be stored in a computer-readable storage medium. The storage medium may further include a read-only memory (ROM), a random access memory (RAM), a magnetic disk, an optical disk and the like.

In conclusion, although the present disclosure has been disclosed with the above embodiments, the above embodiments are not intended to limit the present disclosure. The ordinary skilled in the art may make various changes and retouching without departing from the spirit and scope of the present disclosure, so the protection scope of the present disclosure is subject to the scope defined by the claims.

What is claimed is:

1. A method for processing an application of a mobile terminal, wherein, the method for processing the application of the mobile terminal comprises the following steps:
   distributing a sensor connection interface to the application when the application needs to use a sensor, wherein the application is capable of invoking the sensor to work based on the sensor connection interface;
   detecting whether the mobile terminal is currently in standby state;
   traversing all available sensor connection interfaces in responding to detecting that the mobile terminal is currently in standby state;
   determining whether an application corresponding to each of the available sensor connection interfaces is in accordance with a filtering condition;
   exiting the application in responding to determining that the application corresponding to each of the available sensor connection interfaces is not in accordance with the filtering condition, and restraining the application from holding a corresponding sensor connection by invoking a sensor disabled interface.

2. The method according to claim 1, after traversing all available sensor connection interfaces, further comprising:
   obtaining the application corresponding to each of the available sensor connection interfaces and the sensor connection held by the application.

3. The method according to claim 1, wherein, the method for processing the application of the mobile terminal further comprises:
   holding the application to be turned on in responding to determining that the application corresponding to each of the available sensor connection interfaces is in accordance with the filtering condition, and permitting the application to hold the corresponding sensor connection.

4. The method according to claim 1, after detecting whether the mobile terminal is currently in standby state, further comprising:
   determining whether a power management function is turned on in responding to detecting that the mobile terminal is currently in standby state;
   executing the step of traversing all available sensor connection interfaces in responding to determining that the power management function is turned on.

5. The method according to claim 1, wherein, detecting whether the mobile terminal is currently in standby state, comprising:
   detecting whether one or more operation instructions on one or more physical buttons and a touch screen are received within a preset time period;
   determining that the mobile terminal is currently in standby state in responding to detecting that the one or more operation instructions on the one or more physical buttons and the touch screen are not received within the preset time period; and
   determining that the mobile terminal is currently in non-standby state in responding to detecting that the one or more operation instructions on the one or more physical buttons and the touch screen are received within the preset time period.

6. The method according to claim 1, wherein, detecting whether mobile terminal is currently in standby state, comprising:
   detecting whether a screen of the mobile terminal is in screen-off state;
   determining that the mobile terminal is currently in standby state in responding to detecting that the screen of the mobile terminal is in screen-off state;
   determining that the mobile terminal is currently in non-standby state in responding to detecting that the screen of the mobile terminal is in screen-on state.

7. The method according to claim 1, wherein, the filtering condition comprises a list of applications that are allowed to hold the sensor in standby state.

8. A mobile terminal, comprising:
   a memory configured to store a plurality of function modules;
   a processor configured to execute instructions of the plurality of function modules;
   wherein the plurality of function modules comprises:
      an interface distribution module, configured to distribute a sensor connection interface to the application when the application needs to use a sensor, wherein the application is capable of invoking the sensor to work based on the sensor connection interface;
      a standby detecting module, configured to detect whether the mobile terminal is currently in standby state;

a traversing module, configured to traverse all available sensor connection interfaces in responding to detecting that the mobile terminal is currently in standby state;

a filtering determining module, configured to determine whether an application corresponding to each of the available sensor connection interfaces is in accordance with a filtering condition; and an application forbidding module, configured to exit the application in responding to determining that the application corresponding to each of the available sensor connection interfaces is not in accordance with the filtering condition, and to restrain the application from holding a corresponding sensor connection by invoking a sensor disable interface.

9. The mobile terminal according to claim 8, wherein the plurality of function modules further comprises:

an obtaining module, configured to obtain the application corresponding to each of the available sensor connection interfaces and the sensor connection held by the application.

10. The mobile terminal according to claim 8, wherein the plurality of function modules further comprises:

an application permitting module, configured to hold the application to be turned on in responding to determining that the application corresponding to each of the available sensor connection interfaces is in accordance with the filtering condition, and to permit the application to hold the corresponding sensor connection.

11. The mobile terminal according to claim 8, wherein the plurality of function modules further comprises:

a power management function determining module, configured to determine whether a power management function is turned on in responding to detecting that the mobile terminal is currently in standby state;

wherein the traversing module is configured to traverse all available sensor connection interfaces in responding to determining that the power management function is turned on.

12. The mobile terminal according to claim 8, wherein, the standby detecting module is configured to:

detect whether one or more operation instructions on one or more physical buttons and a touch screen are received within a preset time period, determine that the mobile terminal is currently in standby state in responding to detecting that the one or more operation instructions on the one or more physical buttons and the touch screen are not received within the preset time period; and determine that the mobile terminal is currently in non-standby state in responding to detecting that the one or more operation instructions on the one or more physical buttons and the touch screen are received within the preset time period.

13. The mobile terminal according to claim 8, wherein, the standby detecting module is configured to:

detect whether a screen of the mobile terminal is in screen-off state;

determine that the mobile terminal is currently in standby state in responding to detecting that the screen of the mobile terminal is in screen-off state;

determine that the mobile terminal is currently in non-standby state in responding to detecting that the screen of the mobile terminal is in screen-on state.

14. A non-transitory computer-readable storage medium having stored thereon computer programs that cause a computer to execute a method for processing an application of a mobile terminal, the method comprising:

distributing a sensor connection interface to the application when the application needs to use a sensor, wherein the application is capable of invoking the sensor to work based on the sensor connection interface;

detecting whether the mobile terminal is currently in standby state;

traversing all available sensor connection interfaces in responding to detecting that the mobile terminal is currently in standby state;

determining whether an application corresponding to each of the available sensor connection interfaces is in accordance with a filtering condition;

exiting the application in responding to determining that the application corresponding to each of the available sensor connection interfaces is not in accordance with the filtering condition, and restraining the application from holding a corresponding sensor connection by invoking a sensor disabled interface.

15. The storage medium according to claim 14, wherein the method further comprises:

after traversing all available sensor connection interfaces, obtaining the application corresponding to each of the available sensor connection interfaces and the sensor connection held by the application.

16. The storage medium according to claim 14, wherein the method further comprises:

holding the application to be turned on in responding to determining that the application corresponding to each of the available sensor connection interfaces is in accordance with the filtering condition, and permitting the application to hold the corresponding sensor connection.

17. The storage medium according to claim 14, wherein the method further comprises:

after detecting whether the mobile terminal is currently in standby state, determining whether a power management function is turned on in responding to detecting that the mobile terminal is currently in standby state;

executing the step of traversing all available sensor connection interfaces in responding to determining that the power management function is turned on.

18. The storage medium according to claim 14, wherein, detecting whether the mobile terminal is currently in standby state, comprising:

detecting whether one or more operation instructions on one or more physical buttons and a touch screen are received within a preset time period;

determining that the mobile terminal is currently in standby state in responding to detecting that the one or more operation instructions on the one or more physical buttons and the touch screen are not received within the preset time period; and determining that the mobile terminal is currently in non-standby state in responding to detecting that the one or more operation instructions on the one or more physical buttons and the touch screen are received within the preset time period.

19. The storage medium according to claim 14, wherein, detecting whether the mobile terminal is currently in standby state, comprising:

detecting whether a screen of the mobile terminal is in screen-off state;

determining that the mobile terminal is currently in standby state in responding to detecting that the screen of the mobile terminal is in screen-off state;

determining that the mobile terminal is currently in non-standby state in responding to detecting that the screen of the mobile terminal is in screen-on state.

20. The storage medium according to claim 14, wherein, the filtering condition comprises a list of applications that are allowed to hold the sensor in standby state.

\* \* \* \* \*